US009253002B2

(12) United States Patent
Noguchi et al.

(10) Patent No.: US 9,253,002 B2
(45) Date of Patent: Feb. 2, 2016

(54) NON-CONTACT POWER SUPPLY TRANSMITTER SYSTEM AND RECEIVING DEVICE

(71) Applicant: ROHM CO., LTD., Kyoto (JP)

(72) Inventors: Takashi Noguchi, Kyoto (JP);
Masatoshi Watanabe, Kyoto (JP)

(73) Assignee: ROHM CO., LTD. (JP)

(*) Notice: Subject to any disclaimer, the term of this patent is extended or adjusted under 35 U.S.C. 154(b) by 0 days.

(21) Appl. No.: 14/457,235

(22) Filed: Aug. 12, 2014

(65) Prior Publication Data

US 2015/0049832 A1  Feb. 19, 2015

(30) Foreign Application Priority Data

Aug. 13, 2013  (JP) ................................. 2013-168015

(51) Int. Cl.
*H04L 27/10* (2006.01)
*H04L 27/12* (2006.01)
*H04L 27/14* (2006.01)
*H04L 25/02* (2006.01)

(52) U.S. Cl.
CPC ............ *H04L 27/12* (2013.01); *H04L 25/0268* (2013.01); *H04L 27/14* (2013.01)

(58) Field of Classification Search
CPC ........... H02J 17/00; H02J 5/005; H02J 7/025; H02J 2007/0096; H02M 3/33523
USPC .................................. 375/316, 340; 307/104
See application file for complete search history.

(56) References Cited

U.S. PATENT DOCUMENTS

| 2010/0083012 A1* | 4/2010 | Corbridge et al. ............. 713/300 |
| 2011/0018356 A1* | 1/2011 | Chatterjee ..................... 307/104 |
| 2014/0339914 A1* | 11/2014 | Pooley ........................... 307/104 |
| 2015/0137746 A1* | 5/2015 | Lee ................................ 307/104 |

FOREIGN PATENT DOCUMENTS

| JP | 2012080772 A | 4/2012 |
| JP | 2013-038854 A | 2/2013 |

* cited by examiner

*Primary Examiner* — Freshteh N Aghdam
(74) *Attorney, Agent, or Firm* — Cantor Colburn LLP (57) ABSTRACT

A non-contact power supply transmitter system 100 transmitting an electric power from a transmitting device (TX) 200 to a receiving device (RX) 300 with a non-contact power supply transmitter method, the TX 200 including: a transmitting coil 202; a driver 204 causing the transmitting coil to generate a power signal of the electromagnetic field; and an FSK modulation unit 240 transmitting an FSK signal Sf through the transmitting coil, the RX 300 including: a receiving coil 302; a rectifier circuit 320 rectifying an electric current induced by the receiving coil; an FSK demodulation unit 340 demodulating the FSK signal received through the receiving coil; and a controller 312 controlling so that a rectifying mode of the rectifier circuit is switched to a diode rectifying mode during the FSK communication. The non-contact power supply transmitter system 100 and the RX 300 can execute a stable FSK communication.

18 Claims, 8 Drawing Sheets

FIG. 8C  V<sub>AC1/AC2</sub>

NON-CONTACT POWER SUPPLY TRANSMITTER SYSTEM AND RECEIVING DEVICE

CROSS REFERENCE TO RELATED APPLICATIONS

This application is based upon and claims the benefit of priority from prior Japanese Patent Application No. P2013-168015 filed on Aug. 13, 2013, the entire contents of which are incorporated herein by reference.

FIELD

An embodiment described herein relates to a non-contact power supply transmitter system and a receiving device.

BACKGROUND

In recent years, there is beginning to spread a non-contact power supply transmitter method (it is also called a wireless power supply transmitter method or a contactless power transmission method.) for supplying power to electronic apparatuses, e.g. mobile phoned, tablet-type devices, etc. In order to promote interoperation between products of which manufacturers are different from each other, Wireless Power Consortium (WPC) was organized, and then the Qi standard which is the International Standard was developed by WPC.

Such a non-contact power supply transmitter system includes a transmitting device (TX) and a receiving device (RX). Communication between the transmitting device (TX) and the receiving device (RX) is executed via a rectification waveform. The communication from the transmitting device (TX) to the receiving device (RX) is executed with a Frequency Shift Keying (FSK) signal.

SUMMARY

However, if the distortion is superimposed on the rectification waveform, a distortion component will also be amplified at a subsequent stage in amplification processing, and thereby erroneous detection for the FSK signal occurs. Although a cause of distortion of the rectification waveform is dependent on the type of the rectification systems, it is affected by a variation of a frequency due to the FSK, delicate gap of switching timing in a rectifier circuit, etc. Although measures of repeating such detection processing at only prescribed time intervals in a process unit of subsequent stages etc., for example, are adapted in order to such a problem of the erroneous detection for the FSK signal, that doesn't lead to finding a solution to the root of the problem.

The embodiment described herein provides a non-contact power supply transmitter system and a receiving device, each which can execute a stable FSK communication.

According to one aspect of the embodiment, there is provided a non-contact power supply transmitter system configured to transmit an electric power from a transmitting device to a receiving device with a non-contact power supply transmitter method, the transmitting device comprising: a transmitting coil; a driver configured to cause the transmitting coil to generate a power signal of an electromagnetic field; and an FSK modulation unit configured to transmit an FSK signal through the transmitting coil, the receiving device comprising: a receiving coil; a rectifier circuit configured to rectify an electric current induced by the receiving coil; an FSK demodulation unit configured to demodulate the FSK signal received through the receiving coil; and a controller configured to control so that a rectifying mode of the rectifier circuit is switched to a diode rectifying mode during the FSK communication.

According to another aspect of the embodiment, there is provided a receiving device configured so that an electric power is transmitted from a transmitting device thereto with a non-contact power supply transmitter method, the receiving device comprising: a receiving coil; a rectifier circuit configured to rectify an electric current induced by the receiving coil; an FSK demodulation unit configured to demodulate the FSK signal received through the receiving coil; and a controller configured to control so that a rectifying mode of the rectifier circuit is switched to a diode rectifying mode during the FSK communication.

According to the embodiment, there can be provided the non-contact power supply transmitter system and the receiving device each which can execute the stable FSK communication.

DESCRIPTION OF EMBODIMENTS

Next, certain embodiments will be described with reference to drawings. In the description of the following drawings, the identical or similar reference numeral is attached to the identical or similar part. However, it should be noted that the drawings are schematic and the relation between thickness and the plane size and the ratio of the thickness of each component part differs from an actual thing. Therefore, detailed thickness and size should be determined in consideration of the following explanation. Of course, the part from which the relation and ratio of a mutual size differ also in mutually drawings is included.

Moreover, the embodiment shown hereinafter exemplifies the apparatus and method for materializing the technical idea; and the embodiment does not specify the material, shape, structure, placement, etc. of each component part as the following. The embodiment may be changed without departing from the spirit or scope of claims.

(Basic Technology: Non-Contact Power Supply Transmitter System)

Figure 1:
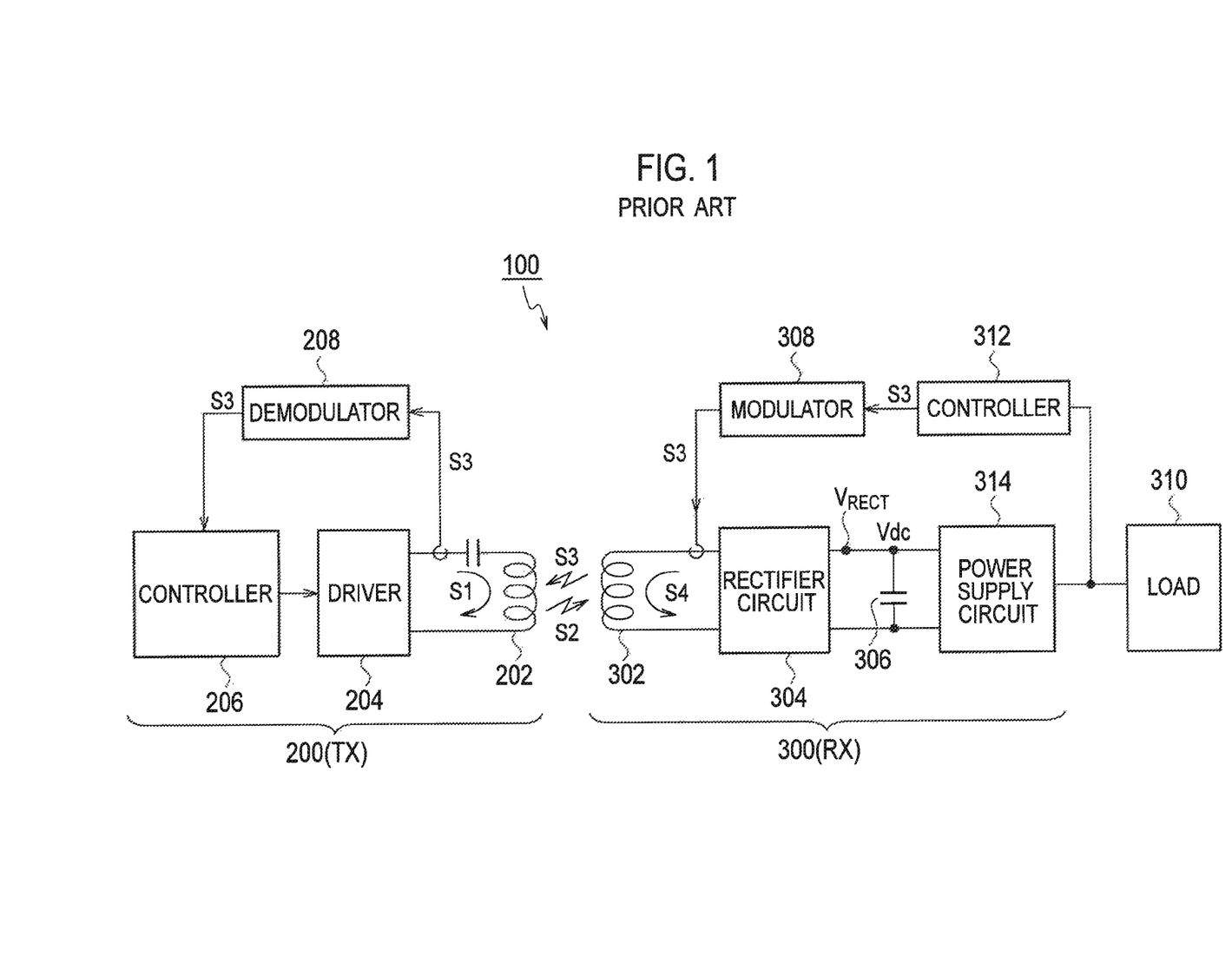
FIG. 1 is a schematic block configuration diagram of a non-contact power supply transmitter system according to a basic technology.

FIG. 1 shows a schematic block configuration of a non-contact power supply transmitter system 100 according to a basic technology. As shown in FIG. 1, the non-contact power supply transmitter system 100 is a system adheres to the Qi standard, and includes a transmitting device (TX) 200 and a receiving device (RX) 300.

The transmitting device (TX) 200 includes a transmitting coil (primary coil) 202, a driver 204, a controller 206, and a demodulator 208. The driver 204 includes an H bridge circuit (full bridge circuit) or a half bridge circuit. The driver 204 applies a driving signal S1 (more specifically, pulse signal) to the transmitting coil 202, and then causes the transmitting coil 202 to generate a power signal S2 of an electromagnetic field with a driving current flowing into the transmitting coil 202. The controller 206 comprehensively controls the whole of the transmitting device (TX) 200. More specifically, the controller 206 changes transmission power by controlling a switching frequency of the driver 204, or by controlling a duty cycle ratio of switching.

The Qi standard defines a communications protocol between the transmitting device (TX) 200 and the receiving device (RX) 300, and can transfer information according to the control signal S3 from the receiving device (RX) 300 to the transmitting device (TX) 200. The control signal S3 is transmitted in the form of being modulated with the Amplitude Modulation (AM) using a backscatter modulation from the receiving coil (secondary coil) 302 to the transmitting coil 202. The control signal S3 includes power control data for indicating an amount of power supplied to the receiving device (RX) 300, and data for indicating specific information on the receiving device (RX) 300, for example. The demodulator 208 demodulates the control signal S3 included in the electric current or voltage of the transmitting coil 202. The controller 206 controls the driver 204 on the basis of the power control data included in the demodulated control signal S3.

The receiving device (RX) 300 includes a receiving coil 302, a rectifier circuit 304, a capacitor 306, a modulator 308, a load circuit 310, a controller 312, and a power supply circuit 314. The receiving coil 302 receives the power signal S2 from the transmitting coil 202, and transmits the control signal S3 to the transmitting coil 202. The rectifier circuit 304 and the capacitor 306 rectify and smooth an electric current S4 induced by the receiving coil 302 in accordance with the power signal S2, and then convert the rectified and smoothed electric current S4 into DC voltage. The power supply circuit 314 charges a secondary battery (not illustrated) using the power supplied from the transmitting device (TX) 200, or boosts or steps down the DC voltage Vdc, and supplies it to the load circuit 310 and other controller 312. The controller 312 monitors the amount of the power received by the receiving device (RX) 300, and then generates the power control data for indicating the amount of the supplied power in accordance to the monitoring. The modulator 308 modulates the coil current and coil voltage of the transmitting coil 202 by modulating the control signal S3 including the power control data, and modulating the coil current of the receiving coil 302.

(Basic Technology: Operating Sequence)

Figure 2:
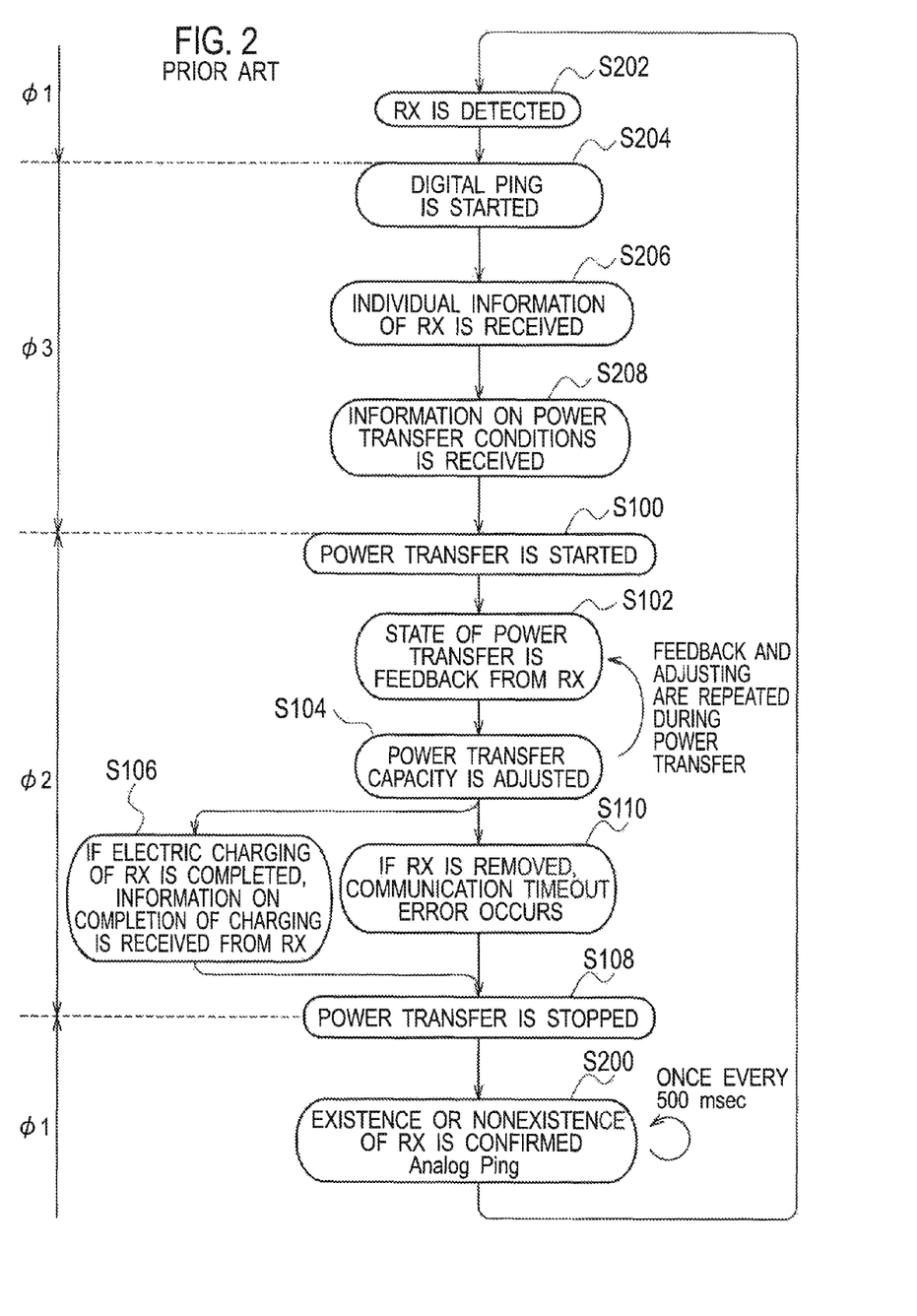
FIG. 2 is an operating sequence diagram showing a transmitting device (TX) in the non-contact power supply transmitter system according to the basic technology.

FIG. 2 shows an operating sequence of the transmitting device (TX) 200 in the non-contact power supply transmitter system 100 according to the basic technology. As shown in FIG. 2, the state of the transmitting device (TX) 200 is classified roughly into a selection phase $\phi 1$, a power transfer phase $\phi 2$, and identification & configuration phase $\phi 3$.

First, the power transfer phase $\phi 2$ will now be explained. If the power transfer from the transmitting device (TX) 200 to the receiving device (RX) 300 is started (S100), the control signal S3 for indicating the present power transfer state is fed back to the transmitting device (TX) 200 from the receiving device (RX) 300 (S102). Thereby, the transmitting device (TX) 200 adjusts power transfer capacity on the basis of the control signal S3 (S104). The feedback of the control signal S3 and the adjusting of the power transfer capacity are repeated during the power transfer (S102→S104→S102→ . . . ). If the control signal S3 indicating completion of charging is transmitted from the receiving device (RX) 300 to the transmitting device (TX) 200 (S106), or if the receiving device (RX) 300 is removed from the power transmission range of the transmitting device (TX) 200, and thereby a timeout error of communication occurs (S110), the transmitting device (TX) 200 stops the power transfer by detecting the state (S108), and then the state of the transmitting device (TX) 200 is shifted to the selection phase $\phi 1$.

Next, the selection phase $\phi 1$ will now be explained. The transmitting device (TX) 200 transmits the power signal S2 at predetermined interval (object detection interval, e.g. 500 msec), and thereby confirms (pings) the existence or nonexistence of the receiving device (RX) 300 (S200). Such a confirmation is called an analog ping phase. If the receiving device (RX) 300 is detected (S202), the state of the transmitting device (TX) 200 is shifted to the identification & configuration phase $\phi 1$.

Finally, the identification & configuration phase $\phi 2$ will now be explained. The transmitting device (TX) 200 executes the digital ping phase (S204), and thereby receives individual information of the receiving device (RX) 300 (S206). Subsequently, information regarding power transfer conditions is transmitted from the receiving device (RX) 300 to the transmitting device (TX) 200 (S208), and then the state of the transmitting device (TX) 200 is shifted to the power transfer phase $\phi 2$.

(Comparative Example)

Figure 3A:
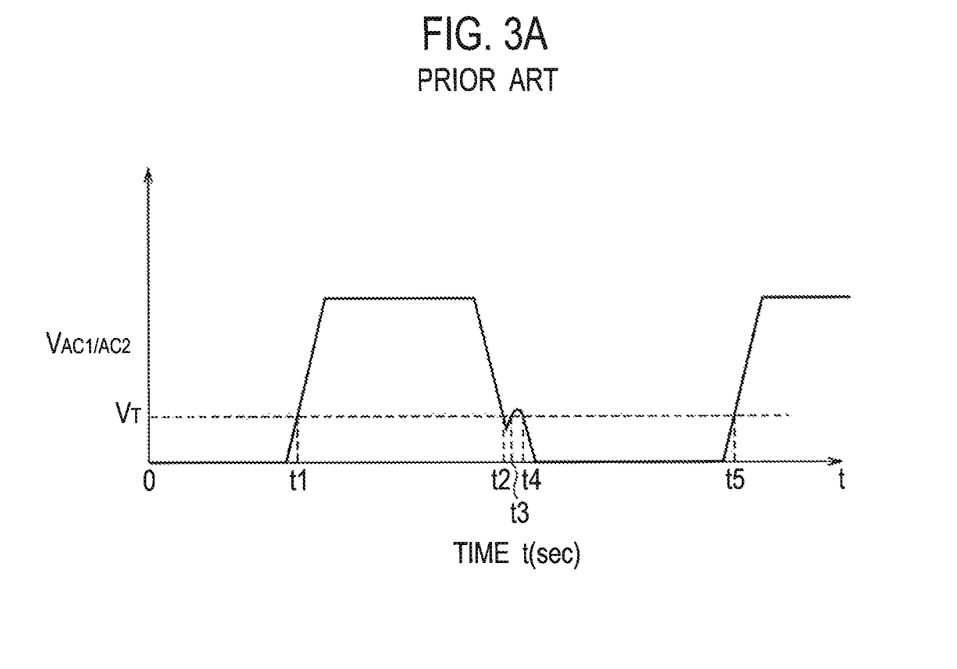
FIG. 3A is a diagram for explaining that an erroneous detection of an FSK signal occurs in a receiving device (RX) according to a comparative example, showing an example of a rectification waveform.
Figure 3B:
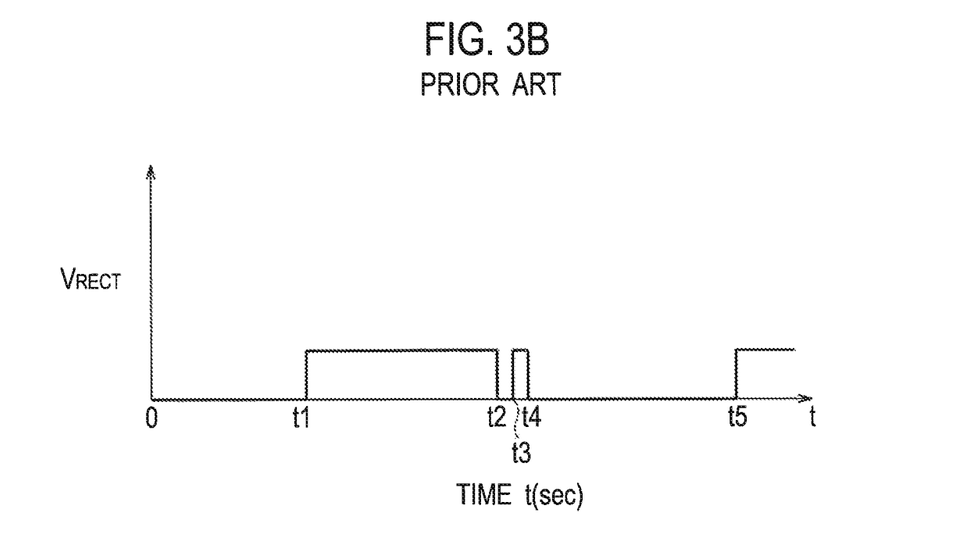
FIG. 3B is a diagram for explaining that an erroneous detection of the FSK signal occurs in the receiving device (RX) according to the comparative example, which is an example of a rectangular-wave waveform.

FIG. 3 shows a diagram for explaining that an erroneous detection of FSK signal Sf occurs in a receiving device (RX) 300 according to a comparative example. FIG. 3A shows a rectification waveform (voltage waveform) $V_{AC1/AC2}$, and FIG. 3B shows a high-amplitude rectangular wave $V_{RECT}$ generated on the basis of the rectification waveform $V_{AC1/AC2}$. As shown in FIGS. 3A and 3B, according to the comparative example, distortion may be superimposed on the rectification waveform $V_{AC1/AC2}$. As already explained, although the cause of distortion of the rectification waveform is dependent on the type of the rectification systems, it is affected by the variation of the frequency due to the FSK, the delicate gap of switching timing in a rectifier circuit 304, etc. In this case, the distortion which exceeds a threshold value $V_T$ is superimposed on the rectification waveform in time periods t3-t4. If such distortion is superimposed thereon, the distortion component is also amplified in amplification processing at the subsequent stage as shown in FIG. 3B, and thereby the erroneous detection of the FSK signal occurs.

(Embodiment)

Hereinafter, the embodiment will now be described focusing on points different from the basic technology or the comparative example.

Figure 4:
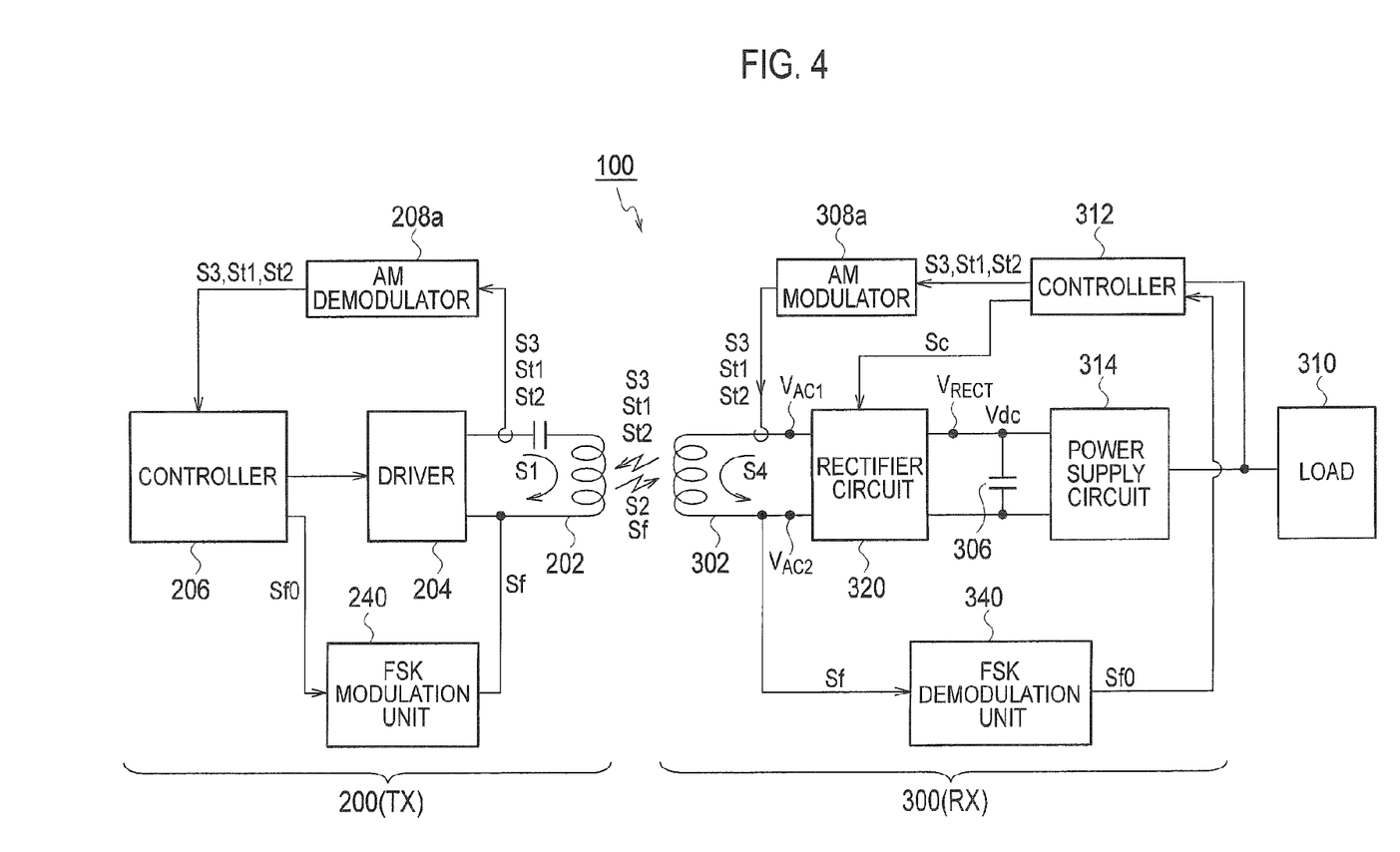
FIG. 4 is a schematic block configuration diagram of a non-contact power supply transmitter system according to the embodiment described herein.

Also in the embodiment, as shown in FIG. 4, it is premised on a non-contact power supply transmitter system 100 configured to execute the FSK communication between the transmitting device (TX) 200 and the receiving device (RX) 300. An FSK modulation unit 240 at the side of the transmitting device (TX) 200 modulates an FSK original signal Sf0 used for an original of FSK signal Sf using the FSK scheme, and then transmits the FSK signal Sf through the transmitting coil 202. An FSK demodulation unit 340 at the side of the receiving device (RX) 300 demodulates the FSK signal Sf included in the electric current or voltage of the receiving coil 302, and then inputs the demodulated FSK signal Sf into a controller 312. In the embodiment, the following configurations are adopted in order to be able to execute a stable FSK communication in such a non-contact power supply transmitter system 100.

(Non-Contact Power Supply Transmitter System)

The non-contact power supply transmitter system 100 according to the embodiment is the non-contact power supply transmitter system 100 configured to transmit an electric power from a transmitting device (TX) 200 to a receiving device (RX) 300 with the non-contact power supply transmitter method. The transmitting device (TX) 200 includes: a transmitting coil 202; a driver 204 configured to cause the transmitting coil 202 to generate a power signal of the electromagnetic field; and an FSK modulation unit 240 configured to transmit an FSK signal Sf through the transmitting coil 202. The receiving device (RX) 300 includes: a receiving coil 302; a rectifier circuit 320 configured to rectify an electric current induced by the receiving coil 302; an FSK demodulation unit 340 configured to demodulate the FSK signal Sf received through the receiving coil 302; and a controller 312 configured to control so that a rectifying mode of the rectifier circuit 320 is switched to a diode rectifying mode during the FSK communication.

More specifically, if the controller 312 detects a start of the FSK communication, the controller 312 may transmit a start trigger signal St1 for the FSK communication to the transmitting device (TX) 200, and then may switch a rectifying mode of the rectifier circuit 320 from a synchronous rectifying mode to the diode rectifying mode. For example, if a control signal Sc input into the rectifier circuit 320 from the controller 312 is shifted from a low level to a high level, the rectifying mode of the rectifier circuit 320 is switched from the synchronous rectifying mode to the diode rectifying mode.

Moreover, if the controller 312 detects an end of the FSK communication, the controller 312 may transmit an end trigger signal St2 for the FSK communication to the transmitting device (TX) 200, and then may switch the rectifying mode of the rectifier circuit 320 from the diode rectifying mode to the synchronous rectifying mode. For example, if the control signal Sc input into the rectifier circuit 320 from the controller 312 is shifted from the high level to the low level, the rectifying mode of the rectifier circuit 320 is switched from the diode rectifying mode to the synchronous rectifying mode.

The receiving device (RX) 300 may include an AM modulator 308a configured to AM-modulate the start trigger signal St1 or the end trigger signal St2. The function of the AM modulator 308a is similar to that of the modulator 308 according to the basic technology. More specifically, the AM modulator 308a AM-modulates the start trigger signal St1 or the end trigger signal St2 and modulates a coil current of the receiving coil 302, and thereby modulates a coil current and coil voltage of the transmitting coil 202.

Moreover, the rectifier circuit 320 is a bridged rectifier circuit configured to rectify the electric current using four rectifier transistors 321, 322, 323, 324, and the controller 312 may switch the rectifying mode of the rectifier circuit 320 by switching ON/OFF of the rectifier transistors 321, 322, 323, 324.

Moreover, the FSK communication may be executed after the identification & configuration phase φ3 between the transmitting device (TX) 200 and the receiving device (RX) 300, and before the power transfer phase φ2 from the transmitting device (TX) 200 to the receiving device (RX) 300.

Moreover, the receiving device (RX) 300 may be mounted in any one of non-contact power transmitter ICs, mobile phones, tablet-type devices, smart phones, audio players, or game machines.

The function of the AM demodulator 208a mounted in the transmitting device (TX) 200 is similar to that of the demodulator 208 according to the basic technology. More specifically, the AM demodulator 208a demodulates the AM-modulated signal (e.g., the start trigger signal St1 and/or the end trigger signal St2) included in the electric current or the voltage of the transmitting coil 202, and then sends the demodulated signal to the controller 206. The controller 206 starts the FSK communication when the start trigger signal St1 is demodulated, and ends the FSK communication when the end trigger signal St2 is demodulated.

(Operating Sequence)

Figure 5:
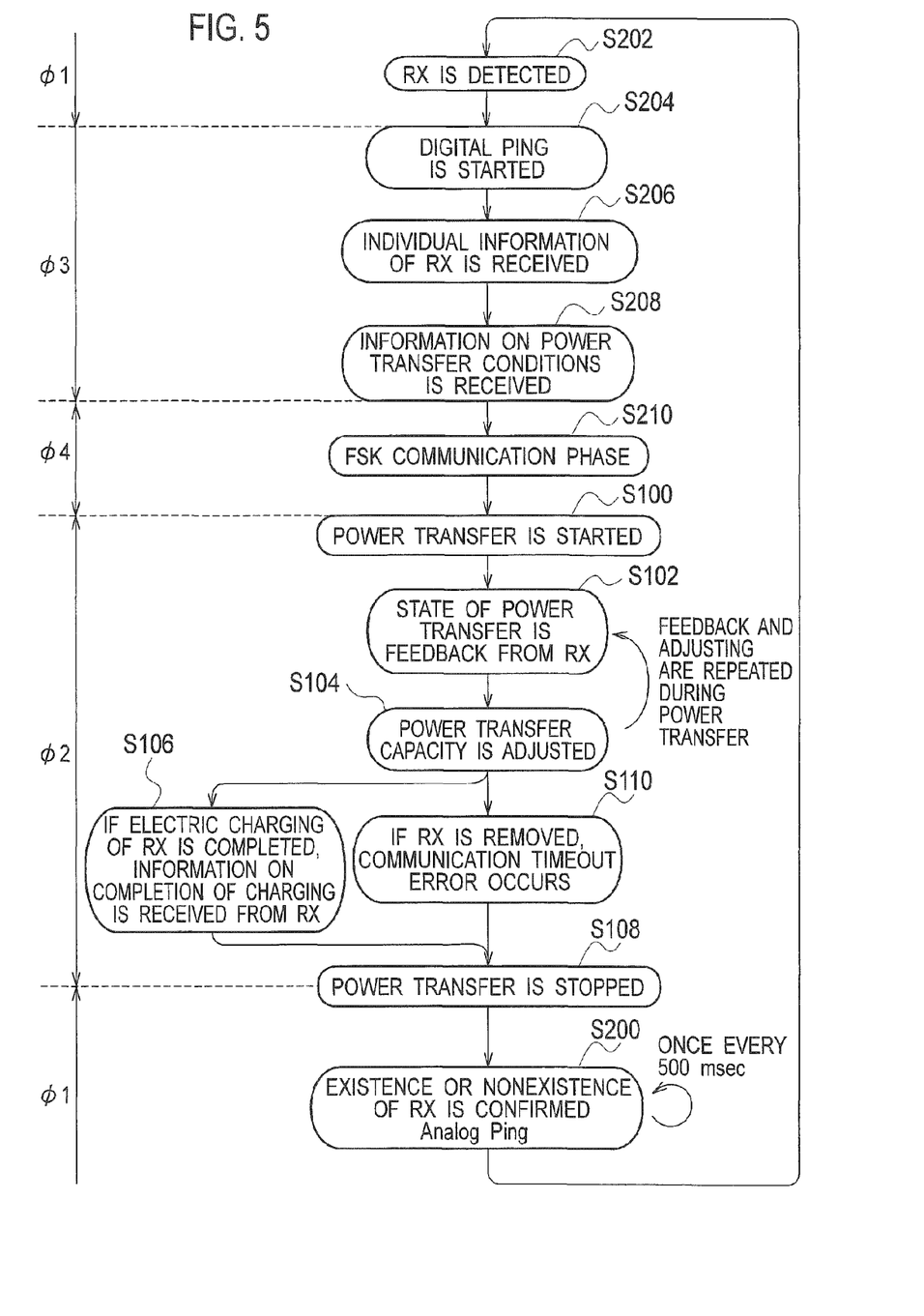
FIG. 5 is an operating sequence diagram of a transmitting device (TX) in the non-contact power supply transmitter system according to the embodiment.

FIG. 5 shows an operating sequence of the transmitting device (TX) 200 in the non-contact power supply transmitter system 100 according to the embodiment. For example, as shown in FIG. 5, the FSK communication may be executed after the identification & configuration phase φ3 between the transmitting device (TX) 200 and the receiving device (RX) 300, and before the power transfer phase φ2 from the transmitting device (TX) 200 to the receiving device (RX) 300.

More specifically, if information regarding the power transfer conditions is transmitted from the receiving device (RX) 300 to the transmitting device (TX) 200 (S208), the state of the transmitting device (TX) 200 is shifted to the FSK communication phase φ4 (S210). Subsequently, after the FSK communication is ended, the state of the transmitting device (TX) 200 is shifted to the power transfer phase φ2, and the power transfer from the transmitting device (TX) 200 to the receiving device (RX) 300 is started (S100). Other operations are similar to those of the basic technology.

(Rectifier Circuit)

Figure 6:
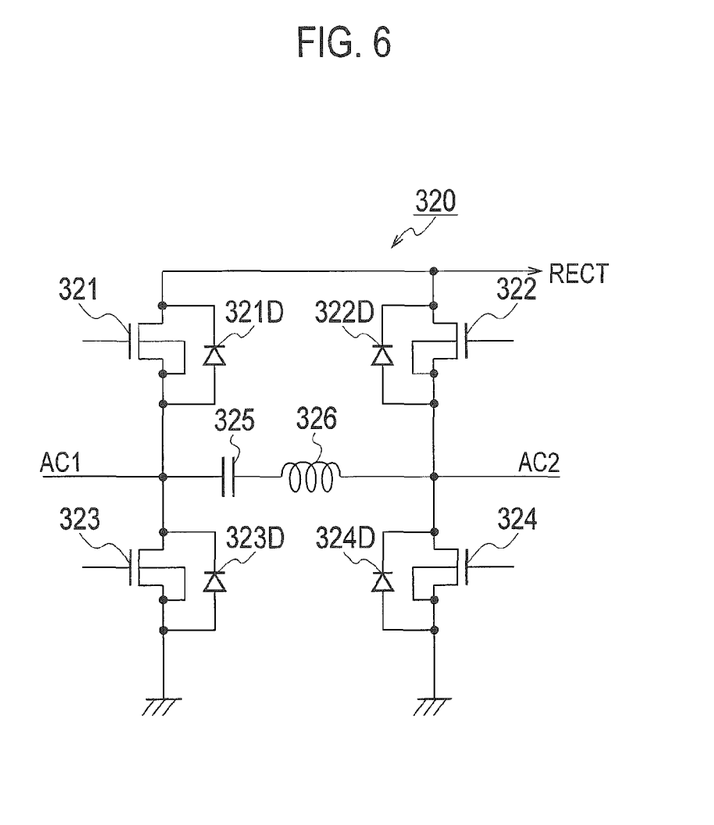
FIG. 6 is a schematic circuit configuration diagram of a rectifier circuit installed in the receiving device (RX) according to the embodiment.

FIG. 6 shows a schematic circuit configuration of the rectifier circuit 320 installed in the receiving device (RX) according to the embodiment. As shown in FIG. 6, the rectifier circuit 320 is a bridged rectifier circuit configured to rectify the electric current using four rectifier transistors 321, 322, 323, 324. The rectifier circuit 320 includes a smoothing circuit composed of a capacitor 325 and a coil 326.

The controller 312 switches the rectifying mode of the rectifier circuit 320 by switching ON/OFF of the rectifier transistors 321, 322, 323, 324. More specifically, respective parasitic diodes (built-in diodes) 321D, 322D, 323D, 324D are formed between respective sources and respective drains of the rectifier transistors 321, 322, 323, 324. Accordingly, if the rectifier transistors 321, 322, 323, 324 are all switched from ON to OFF, the rectifying mode of the rectifier circuit 320 can be switched from the synchronous rectifying mode to the diode rectifying mode. Conversely, if the rectifier transistors 321, 322m 323, 324 are all switched from OFF to ON, the rectifying mode of the rectifier circuit 320 can be switched from the diode rectifying mode to the synchronous rectifying mode.

(Switching Operation of Rectifying Mode)

Figure 7:
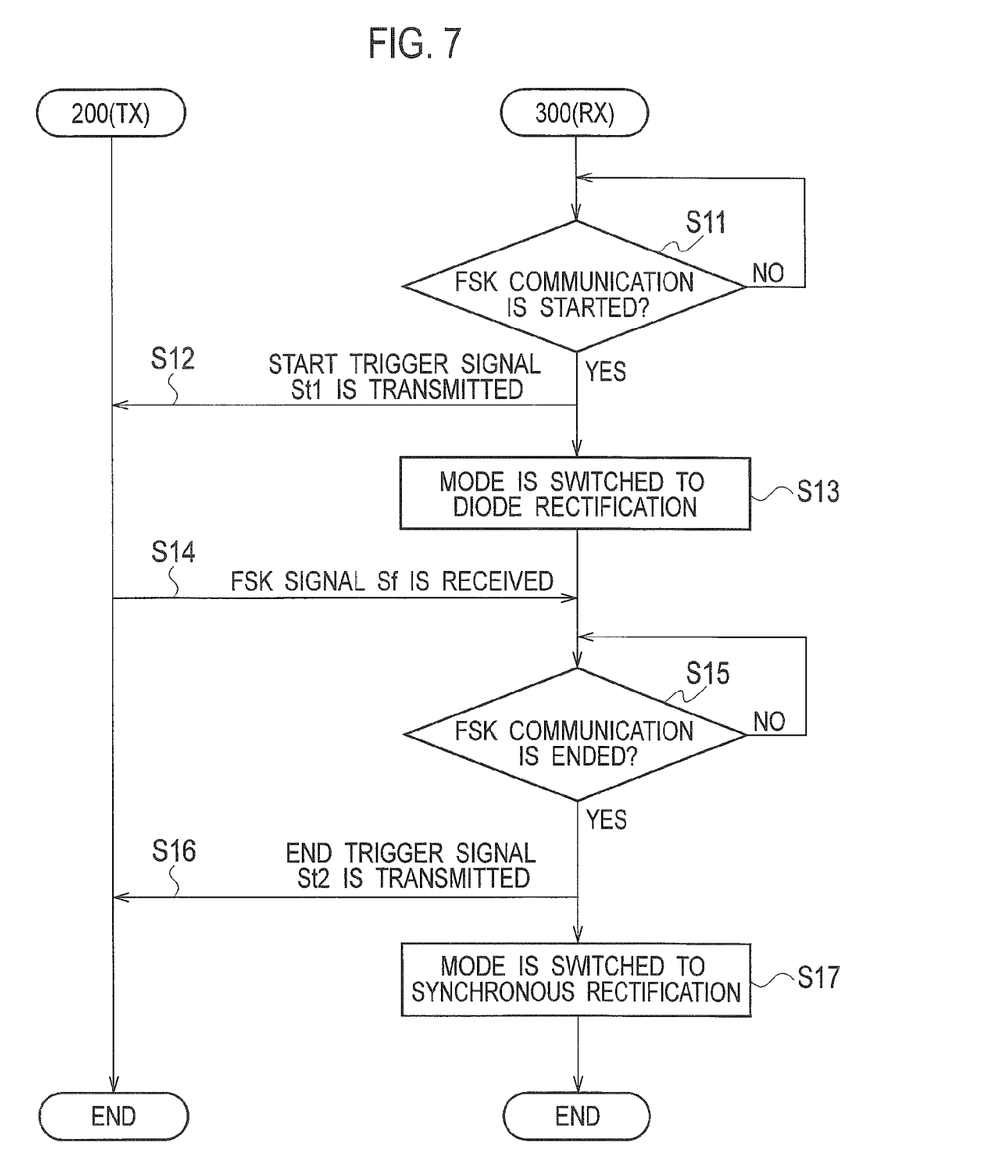
FIG. 7 is a flow chart showing a switching operation of a rectifying mode executed by the rectifier circuit installed in the receiving device (RX) according to the embodiment.

FIG. 7 shows an operation for switching the rectifying mode of the rectifier circuit 320 installed in the receiving device (RX) 300 according to the embodiment.

First, if the controller 312 of the receiving device (RX) 300 detects a start of the FSK communication (S11: YES), the controller 312 transmits the start trigger signal St1 for the FSK communication to the transmitting device (TX) 200 (S12), and then switches the rectifying mode of the rectifier circuit 320 from the synchronous rectifying mode to the diode rectifying mode (S13). Thereby, the start trigger signal St1 is demodulated in the transmitting device (TX) 200, and the FSK signal Sf is transmitted from the transmitting device (TX) 200 to the receiving device (RX) 300 (S14).

The rectifying mode of the rectifier circuit 320 is fixed to the diode rectifying mode during the FSK communication. Since the diode rectification is not dependent on gate voltages of the rectifier transistors 321, 322, 323, 324, distortion is not superimposed on the rectification waveform $V_{AC1/AC2}$. Accordingly, stable FSK communication can be executed, regardless of switching timing of the rectifier circuit 320, etc.

Subsequently, if the controller 312 of the receiving device (RX) 300 detects an end of the FSK communication (S15: YES), the controller 312 transmits the end trigger signal St2 for the FSK communication to the transmitting device (TX) 200 (S16), and then switches the rectifying mode of the rectifier circuit 320 from the diode rectifying mode to the synchronous rectifying mode (S17). Thereby, the end trigger signal St2 is demodulated in the transmitting device (TX) 200, and then the FSK communication is ended.

(Example of Waveform)

Figure 8A:
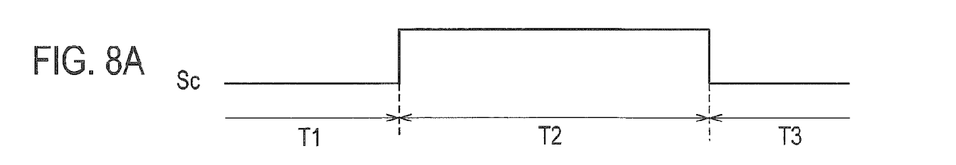
FIG. 8A is a diagram for explaining that the erroneous detection of the FSK signal is eliminated in the receiving device (RX) according to the embodiment, showing an example of a control signal waveform.
Figure 8B:
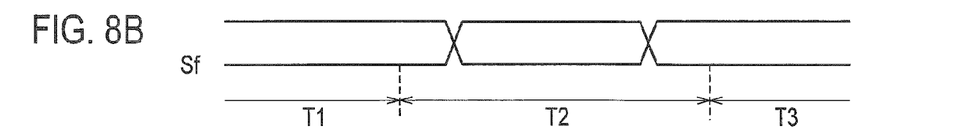
FIG. 8B is a diagram for explaining that the erroneous detection of the FSK signal is eliminated in the receiving device (RX) according to the embodiment, showing an example of an FSK signal waveform.
Figure 8C:
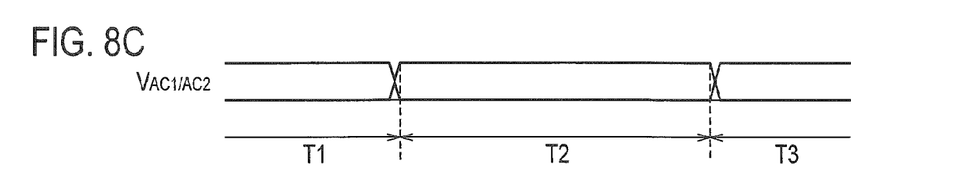
FIG. 8C is a diagram for explaining that the erroneous detection of the FSK signal is eliminated in the receiving device (RX) according to the embodiment, showing an example of a rectification waveform.

FIG. 8 shows a diagram for explaining that an erroneous detection of the FSK signal Sf is eliminated in the receiving device (RX) 300 according to the embodiment. FIG. 8A shows the control signal Sc input into the rectifier circuit 320. FIG. 8B shows the FSK signal Sf input into the FSK demodulation unit 340. FIG. 8C shows the rectification waveform $V_{AC1/AC2}$ of the rectifier circuit 320.

As shown in FIGS. 8A and 8B, the control signal Sc input into the rectifier circuit 320 is shifted from the low level to the high level, and the FSK signal Sf is input into the FSK demodulation unit 340 immediately after the rectifying mode of the rectifier circuit 320 is switched from the synchronous rectifying mode to the diode rectifying mode. Subsequently, immediately after the FSK signal Sf is no longer input into the FSK demodulation unit 340, the control signal Sc input into the rectifier circuit 320 is shifted from the high level to the low level, and then the rectifying mode of the rectifier circuit 320 is switched from the diode rectifying mode to the synchronous rectifying mode.

Accordingly, as shown in FIG. 8C, distortion may be superimposed on the rectification waveform $V_{AC1/AC2}$, during the time periods T1 and T3 when the FSK signal Sf is not input into the FSK demodulation unit 340. On the other hand, during the time period T2 when the FSK signal Sf is input into the FSK demodulation unit 340, distortion is not superimposed on the rectification waveform $V_{AC1/AC2}$. Consequently, it is possible to solve the problem that an erroneous detection of the FSK signal Sf is generated in the receiving device (RX) 300.

As mentioned above, according to the embodiment, the non-contact power supply transmitter system 100 can execute the stable FSK communication. More specifically, since the receiving device (RX) 300 side can control whether or not to execute the FSK communication, the receiving device (RX) 300 side is configured to switch the rectifying mode of the rectifier circuit 320 installed in the receiving device (RX) 300 from the synchronous rectifying mode to the diode rectifying mode, immediately before starting the FSK communication. Thereby, since distortion is not superimposed on the rectification waveform $V_{AC1/AC2}$ during the FSK communication, it becomes possible to execute the stable FSK demodulation in the non-contact power transmitter. Needless to say, if the FSK communication is not under execution, there also is the effect that the synchronous rectifying mode having performance higher than that of the diode rectifying mode can be selected.

As explained above, according to the embodiment, there can be provided the non-contact power supply transmitter system and the receiving device each which can execute the stable FSK communication.

Other Embodiments

As explained above, the embodiment has been described, as a disclosure including associated description and drawings to be construed as illustrative, not restrictive. This disclosure makes clear a variety of alternative embodiments, working examples, and operational techniques for those skilled in the art.

Such being the case, the embodiment cover a variety of embodiments, whether described or not.

What is claimed is:

1. A non-contact power supply transmitter system configured to transmit an electric power from a transmitting device to a receiving device with a non-contact power supply transmitter method,
    the transmitting device comprising:
        a transmitting coil;
        a driver configured to cause the transmitting coil to generate a power signal of an electromagnetic field; and
        a frequency shift keying (FSK) modulation unit configured to transmit an FSK signal through the transmitting coil,
    the receiving device comprising:
        a receiving coil;
        a rectifier circuit configured to rectify an electric current induced by the receiving coil;
        an FSK demodulation unit configured to demodulate the FSK signal received through the receiving coil; and
        a controller configured to control so that a rectifying mode of the rectifier circuit is switched to a diode rectifying mode during the FSK communication, wherein
    if the controller detects a start of the FSK communication, the controller transmits a start trigger signal for the FSK communication to the transmitting device, and then switches the rectifying mode of the rectifier circuit from a synchronous rectifying mode to the diode rectifying mode.

2. A non-contact power supply transmitter system configured to transmit an electric power from a transmitting device to a receiving device with a non-contact power supply transmitter method,
    the transmitting device comprising:
        a transmitting coil;
        a driver configured to cause the transmitting coil to generate a power signal of an electromagnetic field; and
        a frequency shift keying (FSK) modulation unit configured to transmit an FSK signal through the transmitting coil, the receiving device comprising:
- a receiving coil;
- a rectifier circuit configured to rectify an electric current induced by the receiving coil;
- an FSK demodulation unit configured to demodulate the FSK signal received through the receiving coil; and
- a controller configured to control so that a rectifying mode of the rectifier circuit is switched to a diode rectifying mode during the FSK communication, wherein
- if the controller detects an end of the FSK communication, the controller transmits an end trigger signal for the FSK communication to the transmitting device, and then switches the rectifying mode of the rectifier circuit from the diode rectifying mode to the synchronous rectifying mode.

3. The non-contact power supply transmitter system according to claim 1, wherein
if the controller detects an end of the FSK communication, the controller transmits an end trigger signal for the FSK communication to the transmitting device, and then switches the rectifying mode of the rectifier circuit from the diode rectifying mode to the synchronous rectifying mode.

4. The non-contact power supply transmitter system according to claim 1, wherein
the receiving device further comprises an amplitude modulation (AM) modulator configured to AM-modulate the start trigger signal or the end trigger signal.

5. The non-contact power supply transmitter system according to claim 2, wherein
the receiving device further comprises an AM modulator configured to AM-modulate the start trigger signal or the end trigger signal.

6. The non-contact power supply transmitter system according to claim 3, wherein
the receiving device further comprises an AM modulator configured to AM-modulate the start trigger signal or the end trigger signal.

7. The non-contact power supply transmitter system according to claim 1, wherein
the rectifier circuit is a bridged rectifier circuit configured to rectify the electric current using four rectifier transistors, wherein
the controller switches the rectifying mode of the rectifier circuit by switching ON/OFF of the rectifier transistors.

8. The non-contact power supply transmitter system according to claim 1, wherein
the FSK communication is executed after an identification & configuration phase between the transmitting device and the receiving device, and before a power transfer phase from the transmitting device to the receiving device.

9. The non-contact power supply transmitter system according to claim 1, wherein
the receiving device is mounted in any one of a non-contact power transmitter IC, a mobile phone, a tablet-type device, a smart phone, an audio player, or a game machine.

10. A receiving device configured so that an electric power is transmitted from a transmitting device thereto with a non-contact power supply transmitter method, the receiving device comprising:
- a receiving coil;
- a rectifier circuit configured to rectify an electric current induced by the receiving coil;
- a frequency shift keying (FSK) demodulation unit configured to demodulate the FSK signal received through the receiving coil; and
- a controller configured to control so that a rectifying mode of the rectifier circuit is switched to a diode rectifying mode during the FSK communication, wherein
- if the controller detects a start of the FSK communication, the controller transmits a start trigger signal for the FSK communication to the transmitting device, and then switches the rectifier mode of the rectifier circuit from a synchronous rectifying mode to the diode rectifying mode.

11. A receiving device configured so that an electric power is transmitted from a transmitting device thereto with a non-contact power supply transmitter method, the receiving device comprising:
- a receiving coil;
- a rectifier circuit configured to rectify an electric current induced by the receiving coil;
- a frequency shift keying (FSK) demodulation unit configured to demodulate the FSK signal received through the receiving coil; and
- a controller configured to control so that a rectifying mode of the rectifier circuit is switched to a diode rectifying mode during the FSK communication, wherein
- if the controller detects an end of the FSK communication, the controller transmits an end trigger signal for the FSK communication to the transmitting device, and then switches the rectifying mode of the rectifier circuit from the diode rectifying mode to the synchronous rectifying mode.

12. The receiving device according to claim 10, wherein
if the controller detects an end of the FSK communication, the controller transmits an end trigger signal for the FSK communication to the transmitting device, and then switches the rectifying mode of the rectifier circuit from the diode rectifying mode to the synchronous rectifying mode.

13. The receiving device according to claim 10, further comprising
an amplitude modulation (AM) modulator configured to AM-modulate the start trigger signal or the end trigger signal.

14. The receiving device according to claim 11, further comprising
an AM modulator configured to AM-modulate the start trigger signal or the end trigger signal.

15. The receiving device according to claim 12, further comprising
an AM modulator configured to AM-modulate the start trigger signal or the end trigger signal.

16. The receiving device according to claim 10, wherein
the rectifier circuit is a bridged rectifier circuit configured to rectify the electric current using four rectifier transistors, wherein
the controller switches the rectifying mode of the rectifier circuit by switching ON/OFF of the rectifier transistors.

17. The receiving device according to claim 10, wherein
the FSK communication is executed after an identification & configuration phase between the transmitting device and the receiving device, and before a power transfer phase from the transmitting device to the receiving device.

18. The receiving device according to claim 10, wherein the receiving device is mounted in any one of a non-contact power transmitter IC, a mobile phone, a tablet-type device, a smart phone, an audio player, or a game machine.

* * * * *